(No Model.)

G. C. HILPERT.
Eyeglass.

No. 233,756.     Patented Oct. 26, 1880.

WITNESSES:
C. Neveux
C. Sedgwick

INVENTOR:
G. C. Hilpert
BY Munn & Co
ATTORNEYS.

UNITED STATES PATENT OFFICE.

GIDEON C. HILPERT, OF HILL, NEW HAMPSHIRE.

EYEGLASSES.

SPECIFICATION forming part of Letters Patent No. 233,756, dated October 26, 1880.

Application filed April 16, 1880. (No model.)

*To all whom it may concern:*

Be it known that I, GIDEON C. HILPERT, of Hill, in the county of Merrimack and State of New Hampshire, have invented new and Improved Eyeglasses, of which the following is a specification.

The object of this invention is to provide eyeglasses that are adjustable upon the nose in a straight horizontal line instead of with the rolling motion common in other eyeglasses.

The invention consists of lenses connected with each other by means of a straight rod, and adjustable with respect to each other by means of a spiral spring encircling said rod.

Figure 1:
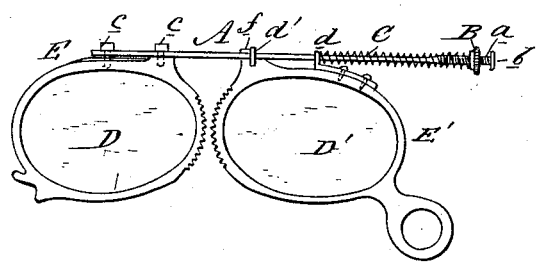
Figure 2:
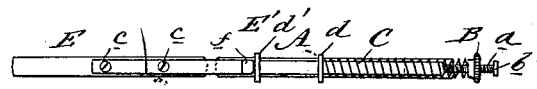

Figure 1 is a front elevation of the glasses closed. Fig. 2 is a plan of the same.

Similar letters of reference indicate corresponding parts.

In the drawings, A represents a straight rod of metal having a screw-thread cut on one end, as shown at *a*, and having on said end a head or button, *b*. Set on the threaded end of the rod A is a nut, B, whose function is to compress the spiral spring C, that encircles the rod A, and thereby increase the strength of said spring C.

D D' represent the lenses fixed in the frames E E', respectively, which frames may be of metal, hard rubber, shell, or other suitable material. The lens D is permanently attached to the end of the rod A by the screws *c c*, or other suitable devices, that pass through said rod A into the upper edge of the frame E. The lens D' is adjustably attached to the rod A by means of the fixed lugs *d d'*, that are fastened to the upper edge of the frame E', the said rod A passing through said lugs *d d'*. The spiral spring C, pressing against the lug *d*, closes the eyeglasses by thereby forcing the lens D' toward the lens D so far that the lug *d'* shall engage against the stop *f* on the top of said bar A, as shown the drawings.

By holding the lens D' between the thumb and middle finger and pressing upon the head *b* with the forefinger the lens D is pushed away from the lens D' in a straight horizontal line, and the glasses are then opened, and when placed upon the nose, with the pressure removed from the head *b*, said lenses D D' approach each other in a straight horizontal line and press against the sides of the nose with the force due to the tension of the spring C.

These eyeglasses require the use of but one hand to open and adjust them. The actuating-spring is more durable than the ordinary eyeglass-spring. The glasses do not wrinkle up the skin of the nose as do those glasses whose pressure is rolling or upward. The lenses come directly and evenly before the eyes, and therefore enable the wearer to see better.

Having thus described my invention, I claim as new and desire to secure by Letters Patent—

1. As an improved article of manufacture, eyeglasses constructed substantially as herein shown and described, consisting of straight rod A, provided with adjusting-nut B, spring C, lenses and frames D D', E E', as set forth.

2. The combination, with the lenses D D' and frames E E', the latter provided with pierced lugs *d d'*, of the rod A and spring C, substantially as herein shown and described.

3. In eyeglasses, the combination, with the rod A, provided with screw-threads *a*, head or button *b*, and stop *f*, of the spring C, substantially as and for the purpose described.

Witnesses:          GIDEON C. HILPERT.
  HORACE TOBEY,
  EDGAR H. TRUMBULL.